United States Patent

Stofer

[15] 3,641,830
[45] Feb. 15, 1972

[54] SAFETY RELEASE FOR TENSIONER OF A BELT OR CHAIN DRIVE

[72] Inventor: Dwight D. Stofer, P.O. Box 116, Santa Clara, Calif. 95052

[22] Filed: Aug. 31, 1970
[21] Appl. No.: 68,448

[52] U.S. Cl.............74/242.6, 74/242.11 A, 74/242.11 C, 74/242.14 R
[51] Int. Cl................................F16h 7/08, F16h 7/10
[58] Field of Search...............74/242.6, 242.11 A, 242.11 C, 74/242.14 R

[56] References Cited

UNITED STATES PATENTS 1,146,166  7/1915  Howg.....................................74/242.6

FOREIGN PATENTS OR APPLICATIONS 502,101  11/1954  Italy......................................74/242.6

Primary Examiner—Leonard H. Gerin
Attorney—Leslie M. Hansen

[57] ABSTRACT

A release mechanism for a spring-loaded tensioning pulley or sprocket and a drive belt or chain by misalignment of the pulley or sprocket and disentrainment of the drive belt or chain relative thereto upon excessive tension developed thereto by insertion of an object between the latter and any pulley or sprocket over which it is trained.

5 Claims, 4 Drawing Figures

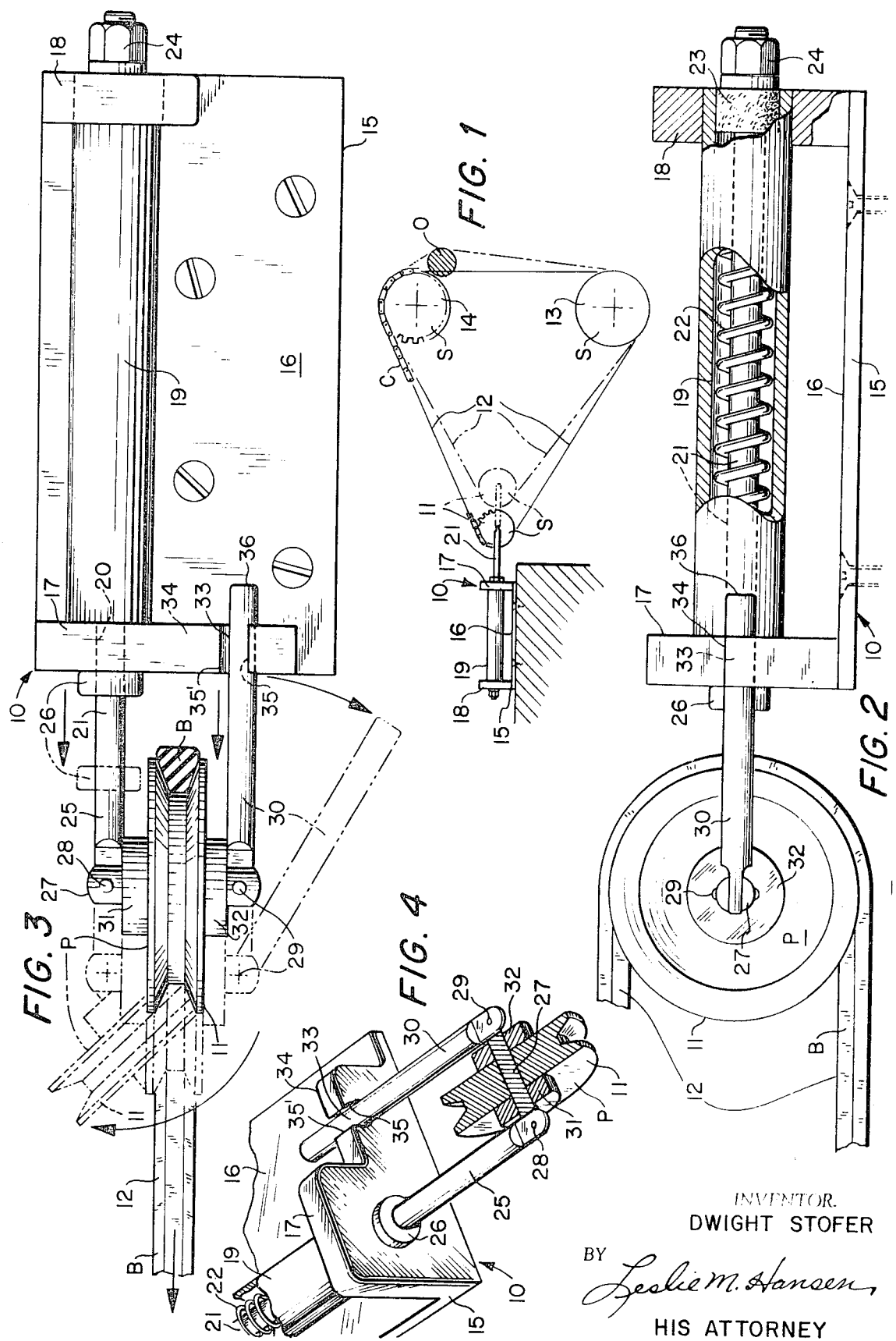

3,641,830

SAFETY RELEASE FOR TENSIONER OF A BELT OR CHAIN DRIVE

BACKGROUND

This invention relates to tensioning device for belt and pulley drive or a chain and sprocket drive and the like and is more particularly directed to a safety release therefor in the event of accidental insertion of an object between such belt or chain and any of the drive mediums about which the belt or chain is trained.

The prior art is replete with tensioning devices for belt or chain drives by means of a spring-loaded rod supporting the drive or idler medium for such drive means. None appear to show a safety release although a U.S. Pat. to Merritt No. 2,726,364 dated Dec. 6, 1955 shows an electrically operated overload detector by which power is cut off when the load reaches an unsafe degree. In no case, however, is the belt or chain released from its entrainment with the drive medium as contemplated by the safety release of the present invention.

STATEMENT OF INVENTION

The present invention has as its object to provide a structure by which a spring-loaded tensioner completely disengages a belt or chain upon insertion of an object between such belt or chain and the spring-loaded medium over which it is trained. In this sense it is an object to quickly release such belt or chain from its trained connection with the spring-loaded tensioner in the event a person's limb such as his arm, hand or fingers become caught in the belt of chain drive. This alleviates and minimizes injury to such person as well as possible damage to the machinery. The device of this application is equally effective for preventing damage to the drive means and source of power due to an overload caused by a tool, broom handle or other like obstruction accidentally inserted between the belt or chain and the tensioned medium associated therewith.

Accordingly it is an object of this invention to provide spring-loaded idler tensioner with an auxiliary support which after excessive tension automatically misaligns the idler with respect to a drive belt or chain for untrainment thereof with respect to the tensioned idler medium.

It is another object to provide means for supporting a tensioned idler medium in alignment with an endless strand of belt or chain and for tensioned movement within the plane of such endless strand for a limited distance. This object contemplates the provision of a dual rod support for the cross shaft of the idler medium facilitating swinging movement the latter ands its cross shaft relative to the plane which the endless strand assumes during driving relations to such idler medium.

These and other objects of the present invention will become apparent in the following description and claims when read in the light of the accompanying drawing in which:

FIG. 1 is a schematic diagram illustrating the safety release tensioner of the present invention applied to a chain and sprocket drive;

FIG. 2 is a side view of the safety release tensioner at larger scale adapted for a belt and pulley drive, parts being broken away for purpose of illustration;

FIG. 3 is plan view of FIG. 2 illustrating the safety release feature; and

FIG. 4 is fragmentary perspective view of the safety release feature of the present invention.

GENERAL DESCRIPTION

Referring to FIG. 1 of the drawing a spring-loaded tensioner shown at 10 has an idler over which is trained an endless flexible strand 12 having drive connection with a drive wheel 13 of a source of power such as an electric motor (not shown) or the like, the strand 12 also being trained around a driven wheel 14 connected to some mechanism for driving the same in a manner well known in the art.

For purpose of illustration the arrangement in FIG. 1 shows the strand 12 as a chain C and the drive, driven and idler wheels 13, 14 and 11, respectively, as sprockets S. In FIGS. 2 and 3 the strand 2 is shown as a belt B and the idler wheel 11 as a pulley P it being understood that the drive and driven wheels 13 and 14 in such case are also pulleys.

DETAILED DESCRIPTION

In accordance with the present invention the tensioner 10 comprises base 15 including a mounting plate 16 adopted to be secured to a fixed member in relation to the drive mechanism. End walls 17 and 18 extend perpendicularly upwardly from the plate 16 and in spaced relation to support a tubular housing 19 therebetween. The housing 19 has one end closed by and supported on the front wall 17 concentric to a bore 20 formed therethrough and the opposite end of the tube 19 is open ended and extends through the back wall 18 and is supported thereby.

A rod 21 is mounted for sliding movement in the bore 20 in the front wall 17 so as to extend forwardly thereof. The rod 21 extends rearwardly the wall 17 concentric to the tubular housing 19 and a compression spring 22 also within the housing, The spring 22 has its fore end bearing against the front wall 17 and its aft end bearing against a plug 23 mounted on the rod 21 and secured by a nut 24 threadedly connected to the extreme aft end of the rod 21.

The fore end 25 of the rod 21 has a collar 26 mounted thereon and secured thereto in a position to engage the fore face of the front wall 17. This limits the movement of the plug 23 beyond or out of the open end of the tubular housing by action of the compression spring 22.

The idler wheel or pulley 11 is mounted on a cross shaft 27 having one end pivotally mounted as at 28 on the extreme fore end 25 of the rod 21. The opposite end of the cross shaft 27 is pivotally connected as at 29 to one end of an auxiliary rod 30. These pivotal connections 28 and 29 serve to enable swingability of the cross shaft 27 and idler pulley 11 relative to the spring-loaded rod 21. However, when the auxiliary rod 30 is parallel to spring-loaded rod 21 and the boss collars 31–32 on the idler pulley 11 embraced by these parallel rods the cross shaft 27 is maintained at right angles to the rods and the idler pulley is maintained in alignment with the belt or drive medium trained around the pulley 11.

Means for latching the auxiliary rod 30 in parallel relation to the spring loaded rod 21 comprises a notch 33 front wall 17. The notch 33 has a rounded seat portion horizontally opposite the bore 20 in the front wall 17 and spaced therefrom identically to the spacing between the pivotal connections 28 and 29 on the cross shaft 27. For purposes of the present invention it will be noted that the notch 33 is of U-shaped form, open at the top edge 34 of the front wall 17 to permit placement of the rod 30 into the notch 33 even though the spring-loaded rod 21 is retracted fully to the stop collar 26 on the latter. It should be noted further that the U-shaped notch 33 is so formed that the side edges 35–35' thereof lean upwardly and toward the spring-loaded rod 21. In this manner the auxiliary rod 30 is maintained in the slot 34 by the outer edge 35 of the latter overlying the rod 30 on that side thereof toward which the latter would normally swing (see arrow a FIG. 3).

The auxiliary rod 30 is of sufficient length to extend rearwardly of the front wall 17 a distance calculated to maintain proper tension on the belt trained about the pulley 11. However, when any object such as that "O" illustrated in FIG. 1 causes an overload against the action of the spring 22, to draw the pulley 11 inwardly the belt, the parallel rods 21 and 30 shift in unison as shown in FIG. 3 until the end 36 of the auxiliary rod 30 passes and is free of the front face of the front wall 17, the tug of the belt on the pulley 11 causes the latter and cross shaft 27 to swing about the pivot 28 to completely release the belt from the tensioning device 10. Thus the object O caught in the belt train is freed and will not be further mutilated or damaged.

From the foregoing it will be appreciated that I have provided a novel safety release for tensioning devices for belt or chain drives. While I have described my new safety release in specific detail it will be appreciated that the same may be varied, modified and/or altered without departing from the spirit or scope of the invention therein as set forth in the appended claims.

What I claim as new and desire to protect by Letters Patent is:

1. In a tensioning device for the idler wheel of an endless drive strand trained about such wheel, and a drive and driven wheel, a safety release comprising:
   1. a cross shaft having such idler wheel mounted thereon;
   2. a first rod having one end thereof pivotally connected to one end of said cross shaft;
   3. a second rod having one end thereof pivotally connected to the opposite end of said cross shaft;
   4. a fixed base having bearing means for receiving said first and second rod for maintaining the latter for sliding movement in spaced parallel relation and perpendicular to said cross shaft;
   5. said second rod having its opposite end free for movement out of its bearing means upon movement of said cross shaft and idler wheel a predetermined distance from said fixed base due to the insertion of an object between the endless drive strand and such drive or driven wheel; and
   6. spring means connected to said first rod for pulling said cross shaft and the idler wheel against the tension of the endless drive strand trained about the idler wheel and for swinging said cross shaft out of perpendicular relation to said first and second rod upon movement of the free end of the latter out of its bearing means to thereby misalign and disentrain the idler wheel relative to such endless drive strand.

2. The safety release in accordance with that of claim 1 in which said fixed base comprises an upstanding wall having said bearing means formed therethrough and in which the bearing for said second rod comprises an open ended U-shaped slot.

3. The safety device in accordance with that of claim 2 in which one edge of said open ended U-shaped slot is slanted to overlie the second rod on that side thereof remote from said first rod.

4. The safety device in accordance with that of claim 3 in which said spring means is a compression spring mounted on the opposite end of said first rod for bearing relation against said upstanding wall of said base on that side of said wall opposite the cross shaft; and means on the extreme end of the opposite end of said first rod bearing against the opposite end of said compression spring for urging said cross shaft toward said upstanding wall of said base.

5. The safety device in accordance with that of claim 4 including a collar secured to said first rod on that side of the upstanding wall of said base for limiting sliding movement of said first rod and said cross shaft and idler wheel thereon toward said wall.

* * * * *